(12) United States Patent
Brown et al.

(10) Patent No.: US 7,050,393 B2
(45) Date of Patent: May 23, 2006

(54) METHOD, SYSTEM, AND PRODUCT FOR ALLEVIATING ROUTER CONGESTION

(75) Inventors: Deanna Lynn Quigg Brown, Pflugerville, TX (US); Vinit Jain, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 09/852,826

(22) Filed: May 10, 2001

(65) Prior Publication Data

US 2002/0167901 A1 Nov. 14, 2002

(51) Int. Cl.
- H04L 12/28 (2006.01)
- H04J 1/16 (2006.01)
- G08C 15/00 (2006.01)
- G06F 11/00 (2006.01)

(52) U.S. Cl. .................. 370/229; 370/235; 370/412
(58) Field of Classification Search ........ 370/229–236, 370/237–412; 709/235–249
See application file for complete search history.

(56) References Cited

U.S. PATENT DOCUMENTS

| | | | | |
|---|---|---|---|---|
| 5,313,454 A * | 5/1994 | Bustini et al. | ............... | 370/231 |
| 6,130,880 A * | 10/2000 | Naudus et al. | ............... | 370/235 |
| 6,215,769 B1 * | 4/2001 | Ghani et al. | ................ | 370/230 |
| 6,219,713 B1 * | 4/2001 | Ruutu et al. | ................ | 709/235 |
| 6,252,851 B1 * | 6/2001 | Siu et al. | .................... | 370/236 |
| 6,483,805 B1 * | 11/2002 | Davies et al. | ............... | 370/235 |
| 6,535,482 B1 * | 3/2003 | Hadi Salim et al. | ........ | 370/229 |
| 6,535,486 B1 * | 3/2003 | Naudus et al. | ............... | 370/235 |
| 6,625,118 B1 * | 9/2003 | Hadi Salim et al. | ........ | 370/229 |
| 6,741,555 B1 * | 5/2004 | Li et al. | ..................... | 370/229 |
| 6,754,200 B1 * | 6/2004 | Nishimura et al. | ......... | 370/349 |
| 2001/0036154 A1 * | 11/2001 | Takagi | ........................ | 370/229 |
| 2002/0110134 A1 * | 8/2002 | Gracon et al. | ............... | 370/412 |
| 2003/0107994 A1 * | 6/2003 | Jacobs et al. | ............... | 370/235 |
| 2003/0137938 A1 * | 7/2003 | Belanger et al. | ............ | 370/230 |

* cited by examiner

Primary Examiner—Man U. Phan
(74) Attorney, Agent, or Firm—Duke W. Yee; Herman Rodriguez; Theodore D. Fay, III

(57) ABSTRACT

A method, system, and product are described for alleviating router congestion when the router is processing packets transmitted by computer systems having a congestion notification capability. The router marks packets transmitted between a first computer system and a second computer system when the first and second computer systems have the congestion notification capability. The marking indicates that the router is moderately congested. A marked packet is then received by the first computer system. The router then drops packets transmitted by the first computer system when the packets were transmitted subsequently to the receipt of the marked packet.

6 Claims, 3 Drawing Sheets

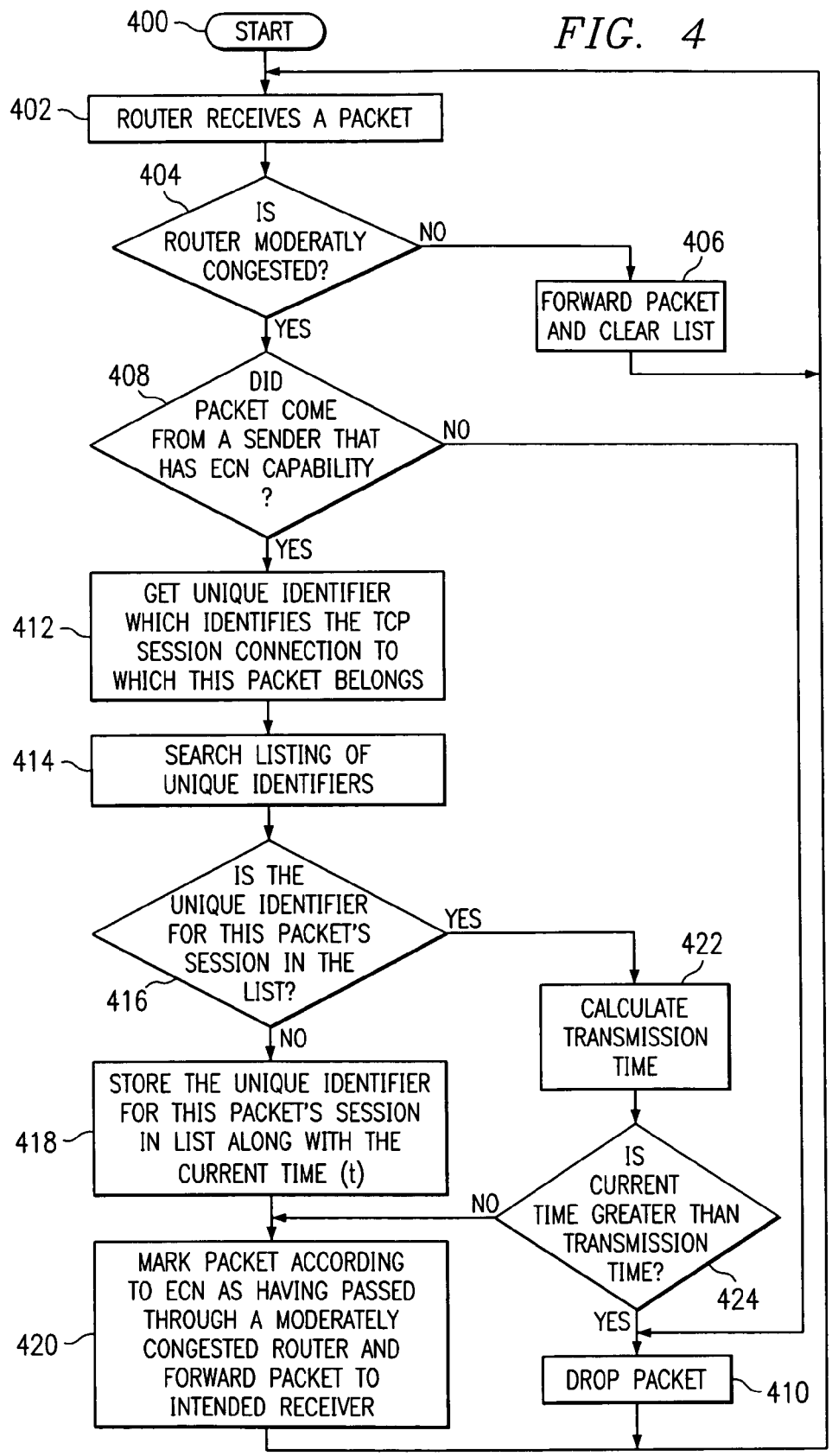

METHOD, SYSTEM, AND PRODUCT FOR ALLEVIATING ROUTER CONGESTION

BACKGROUND OF THE INVENTION

1. Technical Field

The present invention relates generally to the field of computer systems and, more specifically to computer systems including a method, system, and apparatus for alleviating router congestion when the router is processing packets transmitted by computer systems having a congestion notification capability.

2. Description of Related Art

When TCP/IP is used for data transmission between computer systems, the transmitted data is routed through intermediate routers. These routers may experience congestion. When the router is severely congested, the router will drop packets indiscriminately in order to reduce the congestion and to indicate to the sending computer systems that the router is congested.

When the router is only moderately congested, a method of congestion notification has been proposed which requires the marking of packets to indicate congestion to the sending computer systems. An addition to the TCP/IP protocol, called Explicit Congestion Notification (ECN), has been proposed as a method of indicating congestion to the sending computer systems. The ECN describes a method of marking packets in order to provide an indication of moderate congestion prior to the router actually dropping packets. Each packet includes an ECN bit and a Congestion Experienced (CE) bit in the IP header of the packet. The ECN bit may be set by the sender to indicate that the sender and receiver of this packet have the ECN capabilities. The CE bit is set by the router through which a packet passed when the router is experiencing moderate congestion.

When a router which utilizes the ECN protocol is moderately congested, the router will mark and pass packets having the ECN bit set, and will drop packets which do not have the ECN bit set. Therefore, packets transmitted by senders which have the ECN capability receive preference over packets transmitted by senders which do not have the ECN capability.

When senders are notified that a router has become moderately congested, the senders should either cease or slow transmissions in order to relieve the congestion. If a sender without the ECN capability continues to transmit packets, these packets will be dropped. If a sender having the ECN capability continues to transmit packets, its packets will not be dropped until the router becomes severely congested. Therefore, it is possible for senders having the ECN capability to abuse the ECN protocol by continuing to transmit packets even after being notified that the router is moderately congested.

Therefore, a need exists for a system, method, and product for reducing preferential treatment given to packets transmitted by computer systems having a congestion notification capability.

SUMMARY OF THE INVENTION

The present invention is a method, system, and product for alleviating router congestion when the router is processing packets transmitted by computer systems having a congestion notification capability. Routers receive packets transmitted by senders which are capable of receiving a notification that the router is moderately congested. The routers also receive packets from senders which do not have a capability of receiving such a notification.

When a router is moderately congested, the router will mark packets which were transmitted by senders which have the congestion notification capability. The marking indicates that the router is moderately congested. The receiving computer system then receives the packet and is thus notified that the router is congested. The receiving computer system will respond to the received packet by transmitting a packet, such as an acknowledgment, back to the sending computer system. This acknowledgment packet will similarly be marked by the router when the acknowledgment packet is forwarded by the router. When the sending computer system receives this acknowledgment packet which has been marked by the router, the sending computer system is thus notified that the router is moderately congested. The sending computer system then should take an action to reduce the router's congestion, such as by stopping or postponing transmitting packets utilizing this router. If the sending computer system continues to transmit packets utilizing the router after the sender has been notified that the router is congested, the router will alleviate its congestion by dropping these packets transmitted by a sender which has been notified that the router is congested.

Thereafter, the router will monitor the packets that it receives to determine whether any of these packets were transmitted by senders which have the congestion notification capability and which have already been notified that the router is moderately congested. If the router receives packets from senders which have this capability but have ignored the notification and have continued to transmit packets despite the notification, the router will drop these packets until it reaches a state where congestion clears.

Packets transmitted by senders having congestion notification but which have ignored the notification are dropped. Packets from senders which have the congestion notification but which have not yet been notified that the router is congested will continue to be forwarded. Packets from senders which do not have the congestion notification capability are dropped.

In order for the router to determine whether a sender having the congestion notification capability has been notified that the router is moderately congested, the router maintains a listing of identifiers. Each identifier identifies a TCP connection between a sending computer system and a receiving computer system.

The listing of unique identifiers identify TCP session connections. Each TCP session connection is uniquely identified by a unique identifier. Each packet includes this unique identifier.

When the router receives a packet from a computer system having the congestion notification capability, the router will first check its list of identifiers to determine whether the identifier which identifies this computer system's connection is listed. If the router does not find the identifier in the list which identifies the connection between this sending computer system and a receiving computer system, the router will mark the packet, store a copy of the identifier in the list, and store the current time in the list along with the identifier.

If the router does find the identifier in the list, the router will retrieve the time stored in the list with the identifier. The router then determines a round trip time which is the time required for a packet to be transmitted from the sending computer to the receiving computer and back to the sending computer. The router then calculates a transmission time which is the round trip time added to the time stored in the listing.

When the current time is greater than the transmission time, the means that enough time has passed for the sending computer system to receive an acknowledgment packet from the receiving computer system which has been marked by the router and thus have been notified that the router is moderately congested. Therefore, if the current time is greater than the transmission time, the router will drop the packet because the sending computer system is presumed to have been notified that the router is moderately congested.

When the current time is less than the transmission time, the means that not enough time has passed for the sending computer system to receive an acknowledgment packet from the receiving computer system which has been marked by the router. In this case the sending computer system could not have been notified that the router is moderately congested. Therefore, if the current time is less than the transmission time, the router will forward the packet because the sending computer system has not been notified that the router is congested.

When a router goes back to the normal non-congested state, the list of identifiers is deleted. The router will start building a new list when moderate congestion occurs again.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a high level flow chart which depicts a router selectively discarding packets in order to alleviate router congestion when the router is processing packets transmitted by senders which have a congestion notification capability in accordance with the present invention.

DETAILED DESCRIPTION OF THE PREFERRED EMBODIMENT

A preferred embodiment of the present invention and its advantages are better understood by referring to the figures, like numerals being used for like and corresponding parts of the accompanying figures.

The invention is preferably realized using a well-known computing platform, such as an IBM RS/6000 server running the IBM AIX operating system. However, it may be realized in any computer system platforms, such as an IBM personal computer running the Microsoft Windows operating system or a Sun Microsystems workstation running operating systems such as UNIX or LINUX or a router system from Cisco or Juniper, without departing from the spirit and scope of the invention.

Figure 1:
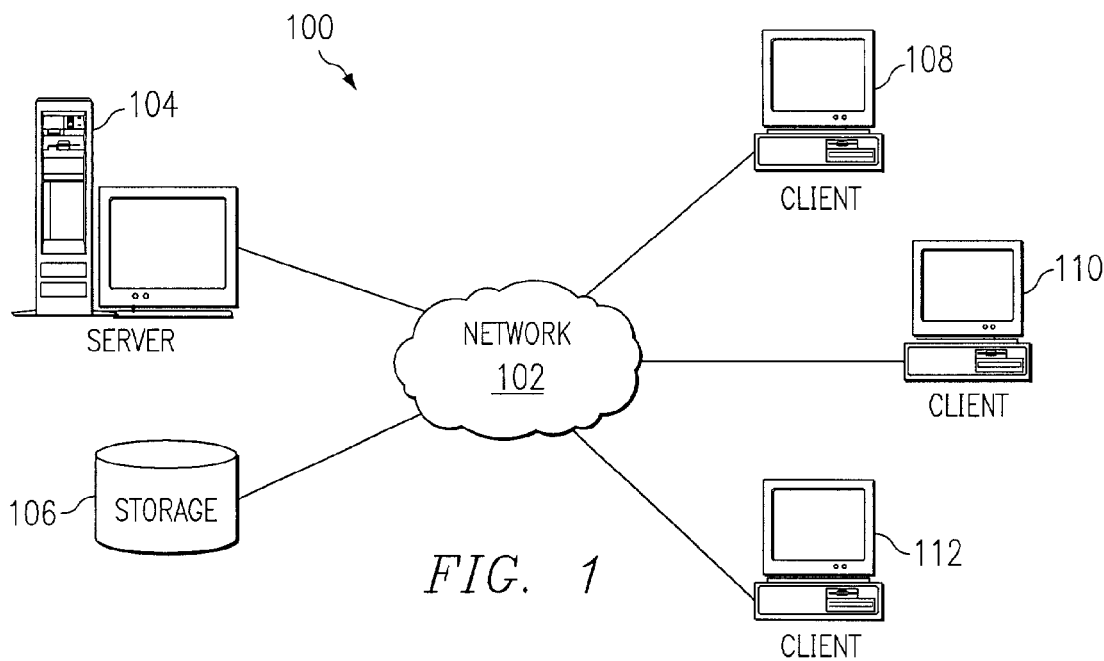
FIG. 1 depicts a block diagram of a data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
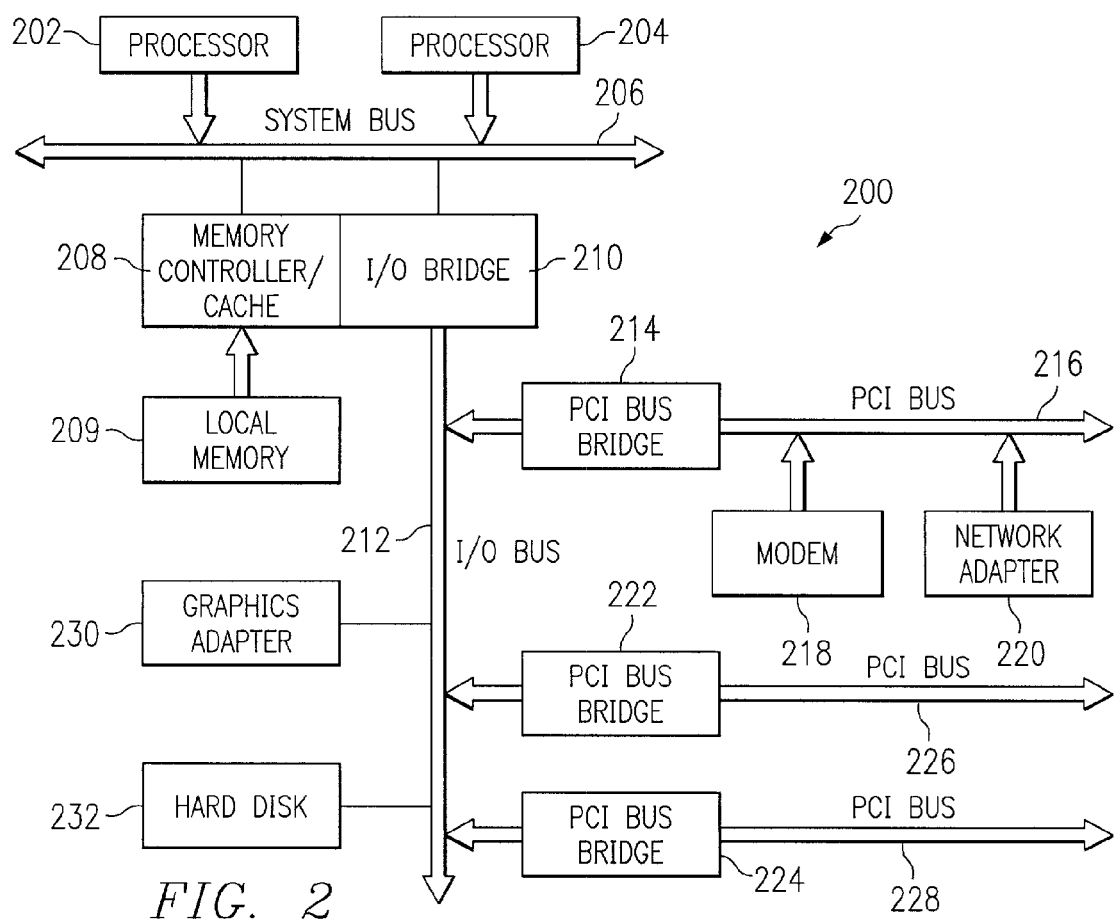
FIG. 2 illustrates a block diagram of a computer system which may be utilized as a server computer system in accordance with the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
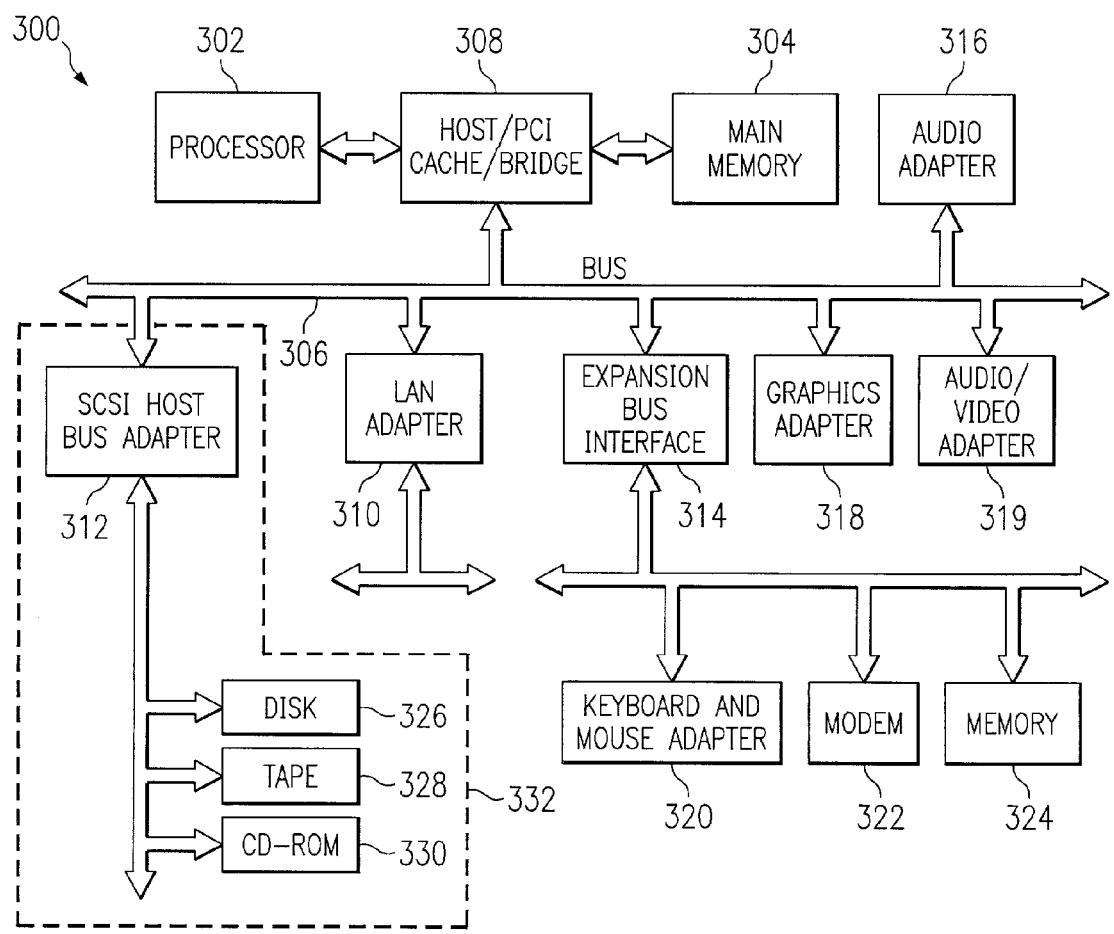
FIG. 3 depicts a block diagram of a computer system which may be utilized as a client computer system in accordance with the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

FIG. 4 is a high level flow chart which depicts a router selectively discarding packets from senders which continue to transmit utilizing moderately congested routers despite being notified that the router is congested in accordance with the present invention. The process starts as depicted by block 400 and thereafter passes to block 402 which illustrates a router receiving a packet. Next, block 404 depicts a determination of whether or not the router is moderately congested. If a determination is made that the router is not moderately congested, the process passes to block 406 which illustrates the router forwarding the packet and clearing a list of unique identifiers. The process then passes to block 402.

Referring again to block 404, if a determination is made that the router is moderately congested, the process passes to block 408 which depicts a determination of whether or not the packet was transmitted by a sender having a capability of receiving congestion notifications, such as ECN. If a determination is made that this sender does not have a congestion notification capability, the process passes to block 410 which illustrates the router dropping the packet. The process then passes back to block 402.

Referring again to block 408, if a determination is made that this sender does have a congestion notification capability, the process passes to block 412 which depicts the router getting the unique identifier which identifies the TCP session connection to which this packet belongs. Each TCP session will have an associated unique identifier which uniquely identifies the session. Every packet will have information the identifies its associated TCP session. Next, block 414 illustrates the router searching its listing of unique identifiers. Thereafter, block 416 depicts a determination of whether or not the unique identifier which identifies this packet's TCP session is stored in the list. If a determination is made that the unique identifier which identifies this packet's TCP session was not found in the list, the process passes to block 418 which depicts the router storing the unique identifier which identifies this packet's TCP session in the listing. The current time (t) is also stored in the listing along with the unique identifier for this packet's session. The process then passes to block 420 which illustrates the router marking the packet according to congestion notification protocols, such as ECN, as having passed through a moderately congested router. This marked packet is then forwarded to its intended receiver. The process then passes back to block 402.

Referring again to block 416, if a determination is made that the unique identifier which identifies this packet's session was found in the listing, the router retrieves the time (t) stored in the listing with the unique identifier which identifies this packet's session. Next, block 422 depicts the router calculating a transmission time. The transmission time is the time stored with this listing plus the estimated round trip time for a packet. Next, block 424 depicts a determination of whether or not the current time is greater than the transmission time. If a determination is made that the current time is greater than the transmission time, the process passes back to block 410. Referring again to block 424, if a determination is made that the current time is not greater than the transmission time, the process passes to block 420.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of alleviating congestion in a router when processing packets transmitted by computer systems having a congestion notification capability, said method comprising:

notifying said computer systems that said router is congested; and
   dropping packets transmitted by said computer systems after said notification;
   receiving, utilizing said router, a packet transmitted by a first computer system;
   determining, utilizing said router, whether said packet was transmitted subsequently to a receipt by said first computer system of a marked packet;
   in response to a determination that said packet was transmitted by said first computer system subsequently to said receipt of said marked packet, dropping, by said router, said packet;
   in response to a determination that said packet was not transmitted subsequently to said receipt of said marked packet, forwarding, by said router, said packet;
   in response to each receipt by said router of a packet transmitted by said first computer system, determining whether an identifier which identifies a connection between said first computer system and a second computer system is stored in a list of identifiers within said router;
   in response to a determination that said identifier which identifies said connection is stored in said list, determining that said packet was transmitted subsequently to said receipt of said marked packet;
   in response to a determination that said identifier which identifies said connection is not stored in said list, determining that said packet was not transmitted subsequently to said receipt of said marked packet and storing said identifier in said list within said router;
   including with said identifier a time stamp indicating a current time said packet was received by said router;
   wherein the step of determining whether said packet was transmitted subsequently to said receipt of said marked packet further comprises the steps of:

in response to each receipt by said router of a second packet transmitted by said first computer system, determining whether said identifier is stored in said list; and
   in response to a determination that said identifier which identifies said connection is included in said list, determining that said second packet was transmitted subsequently to said receipt of said marked packet;
   wherein the step of in response to a determination that said identifier which identifies said connection is stored in said list, determining that said packet was transmitted subsequently to said receipt of said marked packet further comprises the steps of:

in response to a receipt of said second packet, calculating a transmission time;
   determining whether a current time is greater than said transmission time;
   in response to a determination that said current time is greater than said transmission time, determining that said second packet was transmitted subsequently to said receipt of said marked packet; and
   in response to a determination that said current time is equal to or less than said transmission time, determining that said second packet was not transmitted subsequently to said receipt of said marked packet.

2. The method according to claim 1, further comprising the step of calculating said transmission time by adding said time stamp to a round trip time, said round trip time being a time required for a packet to travel from said first computer system to said second computer system and back to said first computer system.

3. A computer program product for alleviating congestion in a router when said router is processing packets transmitted by computer systems having a congestion notification capability, said computer program product comprising:

instructions for notifying said computer systems that said router is congested;
   instructions for dropping packets transmitted by said computer systems after said notification;
   instructions for receiving, utilizing said router, a packet transmitted by a first computer system;
   instructions for determining, utilizing said router, whether said packet was transmitted subsequently to a receipt by said first computer system of a marked packet;
   in response to a determination that said packet was transmitted by said first computer system subsequently to said receipt of said marked packet, instructions for dropping, by said router, said packet;
   in response to a determination that said packet was not transmitted subsequently to said receipt of said marked packet, instructions for forwarding, by said router, said packet;
   wherein said instructions for determining whether said packet was transmitted subsequently to said receipt of said marked packet further comprises:

in response to each receipt by said router of a packet transmitted by said first computer system, instructions for determining whether an identifier which identifies a connection between said first computer system and a second computer system is stored in a list of identifiers within said router; and
   in response to a determination that said identifier which identifies said connection is stored in said list, instructions for determining that said packet was transmitted subsequently to said receipt of said marked packet;

in response to a determination that said identifier which identifies said connection is not stored in said list, instructions for determining that said packet was not transmitted subsequently to said receipt of said marked packet and storing said identifier in said list within said router;

instructions for including with said identifier a time stamp indicating a current time said packet was received by said router;

wherein said instructions for determining whether said packet was transmitted subsequently to said receipt of said marked packet further comprises:

in response to each receipt by said router of a second packet transmitted by said first computer system, instructions for determining whether said identifier is stored in said list; and in response to a determination that said identifier which identifies said connection is included in said list, instructions for determining that said second packet was transmitted subsequently to said receipt of said marked packet;

wherein said instructions for in response to a determination that said identifier which identifies said connection is stored in said list, determining that said packet was transmitted subsequently to said receipt of said marked packet, further comprises:

in response to a receipt of said second packet, instructions for calculating a transmission time;

instructions for determining whether a current time is greater than said transmission time;

in response to a determination that said current time is greater than said transmission time, instructions for determining that said second packet was transmitted subsequently to said receipt of said marked packet; and in response to a determination that said current time is equal to or less than said transmission time, instructions for determining that said second packet was not transmitted subsequently to said receipt of said marked packet.

4. The product according to claim 3, further comprising instructions for calculating said transmission time by adding said time stamp to a round trip time, said round trip time being a time required for a packet to travel from said first computer system to said second computer system and back to said first computer system.

5. A router system for alleviating congestion when processing packets transmitted by computer systems having a congestion notification capability, said router system having at least one router adapted to perform the steps of:

notifying said computer systems that said router is congested, dropping packets transmitted by said computer systems after said notification;

receiving a packet transmitted by a first computer system;

determining whether said packet was transmitted subsequently to a receipt by said first computer system of a marked packet;

in response to a determination that said packet was transmitted by said first computer system subsequently to said receipt of said marked packet, dropping said packet;

in response to a determination that said packet was not transmitted subsequently to said receipt of said marked packet, forwarding said packet;

in response to a determination that said identifier which identifies said connection is not stored in said list, determining that said packet was not transmitted subsequently to said receipt of said marked packet and storing said identifier in said list within said router;

including with said identifier a time stamp indicating a current time said packet was received by said router;

wherein determining whether said packet was transmitted subsequently to said receipt of said marked packet further comprises:

in response to each receipt by said router of a second packet transmitted by said first computer system, determining whether said identifier is stored in said list; and in response to a determination that said identifier which identifies said connection is included in said list, determining that said second packet was transmitted subsequently to said receipt of said marked packet;

in response to a receipt of said second packet, calculating a transmission time; determining whether a current time is greater than said transmission time;

in response to a determination that said current time is greater than said transmission time, determining that said second packet was transmitted subsequently to said receipt of said marked packet; and in response to a determination that said current time is equal to or than said transmission time, determining that said second packet was not transmitted subsequently to said receipt of said marked packet.

6. The system according to claim 5 wherein the router is further adapted to perform the step of:

calculating said transmission time by adding said time stamp to a round trip time, said round trip time being a time required for a packet to travel from said first computer system to said second computer system and back to said first computer system.

* * * * *